United States Patent
Richard

(10) Patent No.: US 7,517,393 B2
(45) Date of Patent: Apr. 14, 2009

(54) JET PULSE CHAMBER VENTURI DUST COLLECTOR

(76) Inventor: Kenneth L. Richard, 509 English Village Way, Knoxville, TN (US) 37930

(*) Notice: Subject to any disclaimer, the term of this patent is extended or adjusted under 35 U.S.C. 154(b) by 427 days.

(21) Appl. No.: 11/342,811

(22) Filed: Jan. 31, 2006

(65) Prior Publication Data
US 2007/0175328 A1    Aug. 2, 2007

(51) Int. Cl.
B01D 46/04 (2006.01)

(52) U.S. Cl. .................. 95/280; 55/302; 55/341.1; 55/381; 55/498; 55/502

(58) Field of Classification Search .............. 55/302, 55/283, 290, 294, 498, 502, 529, 385.1, 341.1, 55/381; 95/278, 279, 280; 210/411, 412, 210/493.1; 60/312, 336
See application file for complete search history.

(56) References Cited

U.S. PATENT DOCUMENTS

| | | | |
|---|---|---|---|
| 3,594,992 A * | 7/1971 | Carr et al. ............ 55/302 |
| 3,676,242 A * | 7/1972 | Prentice .............. 156/62.4 |
| 3,841,953 A * | 10/1974 | Lohkamp et al. ........ 442/350 |
| 3,849,241 A * | 11/1974 | Butin et al. ........... 428/137 |
| 3,878,014 A * | 4/1975 | Melead ................ 156/167 |
| 4,218,227 A * | 8/1980 | Frey ................... 55/302 |
| 4,331,459 A * | 5/1982 | Copley ................ 55/302 |
| 4,364,751 A * | 12/1982 | Copley ................ 95/280 |
| 4,610,704 A | 9/1986 | Richard ............... 55/302 |
| 7,282,075 B2 * | 10/2007 | Sporre et al. .......... 55/302 |

* cited by examiner

Primary Examiner—Duane S Smith
Assistant Examiner—Minh-Chau T Pham
(74) Attorney, Agent, or Firm—James G. O'Boyle, Esq.

(57) ABSTRACT

A jet pulse chamber venturi collector wherein a venturi is provided between the upper end portions of adjacent columns of filter stacks mounted in a dust collector housing wherein particulate laden gases flow downwardly through the venturi and are accelerated to such a degree so as to be pushed directly into the dust collecting hopper. A double pulse cleaning system fires a first pulse of compressed air into the interior of the filter stacks, which is instantaneously followed by a second pulse.

6 Claims, 3 Drawing Sheets

JET PULSE CHAMBER VENTURI DUST COLLECTOR

BACKGROUND OF THE INVENTION

The present invention represents an improvement over the downflow industrial filter dust collector disclosed in my U.S. Pat. No. 4,610,704 dated Sep. 9, 1986, the disclosure of which is incorporated herein by reference.

In the above-noted patent, a plurality of individual filter elements are enclosed in a collector housing which admits particulate laden gases so as to flow downwardly and radially inwardly of the individual filter elements so that particulates accumulate on the exterior of the filters. The interior of the filter elements communicate with a common clean air duct at the bottom of the housing and the exterior of the filter elements communicate with a hopper for collecting particulates from the filters.

In order to periodically clean the filter elements, a compressed air source is arranged to fire pulses of compressed air through a nozzle into the interior of the filter elements to remove the particulates from the exterior surface of the filter elements.

After considerable research and experimentation, the jet pulse chamber venturi dust collector of the present invention has been devised wherein a venturi is provided between adjacent columns of filter stacks, whereby the incoming dust laden air flows through the venturi surfaces and is accelerated and reaccelerated so that a significant amount of dust bypasses the filters and flows downwardly directly to the dust collecting hopper. The balance of dust particles collect on the exterior surfaces of the filter elements awaiting the next pulsing/reaccelerating cycle. It can be seen that this essentially reduces and controls the downflow area, cross section ratio, A/C.

A double pulse cleaning system can be provided for cleaning the filter elements, wherein a first pulse of compressed air is fired, as programmed, which is instantaneously followed by a second pulse.

SUMMARY OF THE INVENTION

The jet pulse chamber venturi dust collector of the present invention comprises, essentially, a venturi provided between adjacent columns of filter stacks mounted in a dust collector housing of the type wherein particulate laden gases are admitted into the top of the housing and flow downwardly between adjacent columns of filter stacks. The venturi is provided by adjacent conical end caps securing the stacked filter elements in columns which form a throat portion through which the particulate laden gases flow and are accelerated to such a degree so as to be pushed directly to the dust collecting hopper.

The double pulse cleaning system for cleaning the filters comprises, essentially, a compressed air source communicating with a nozzle which communicates with the interior of the filter elements. An electrically operated valve is operatively connected to each nozzle, and a controller is connected to each valve, whereby the controller is programmed to fire a first pulse of compressed air which is instantaneously followed by a second pulse.

By the construction and arrangement of the venturis and the double pulse cleaning system, the dust particles are pushed and pulled away from the filter elements and forced downwardly between the dual filter stacks directly to the hopper. This is an important improvement over the present pulse cleaning systems which depend primarily on gravity to move dust particles downwardly.

DESCRIPTION OF THE PREFERRED EMBODIMENT

Figure 1:
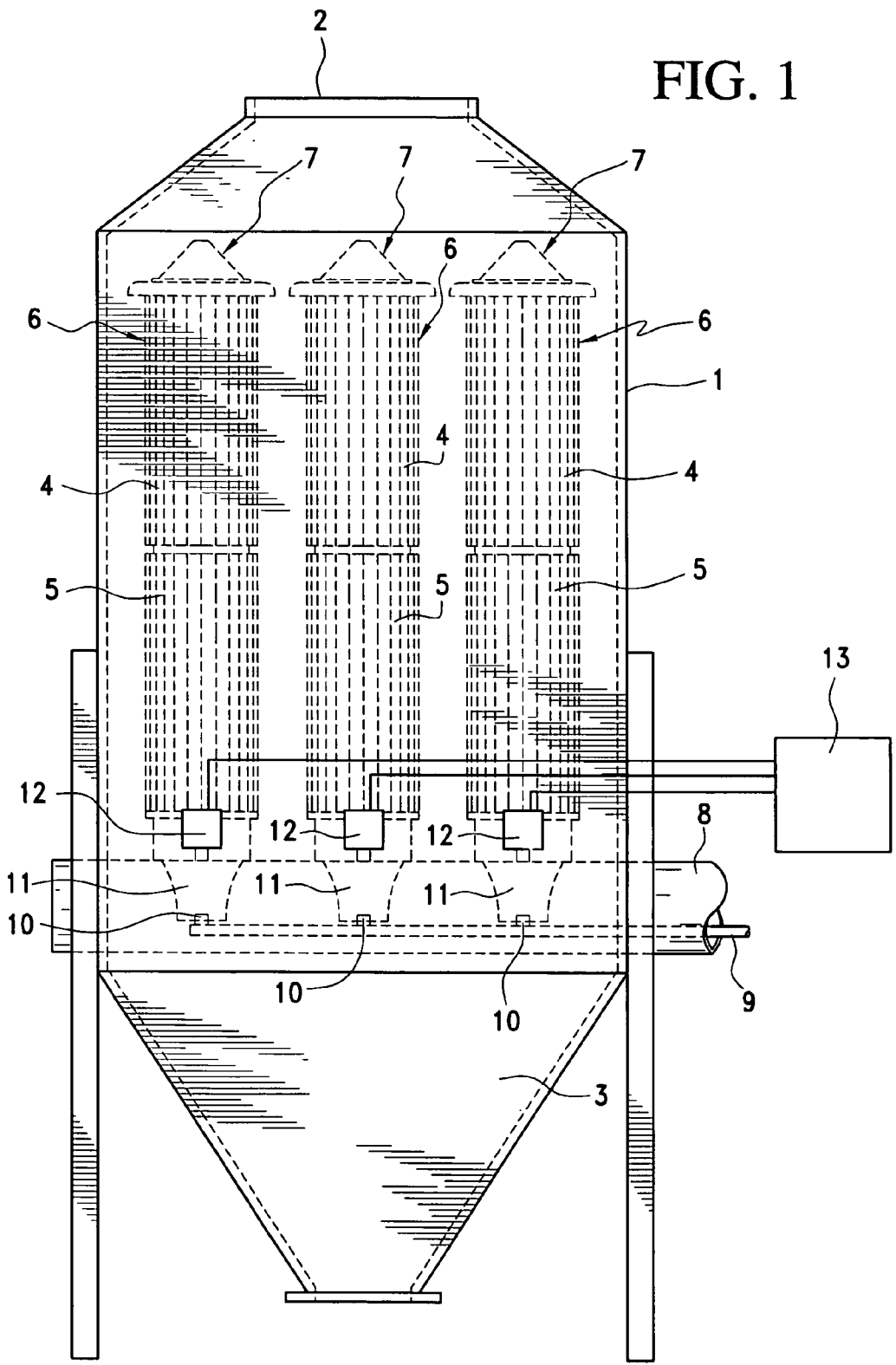
FIG. 1 is a side elevational view of the jet pulse chamber venturi dust collector of the present invention.
Figure 2:
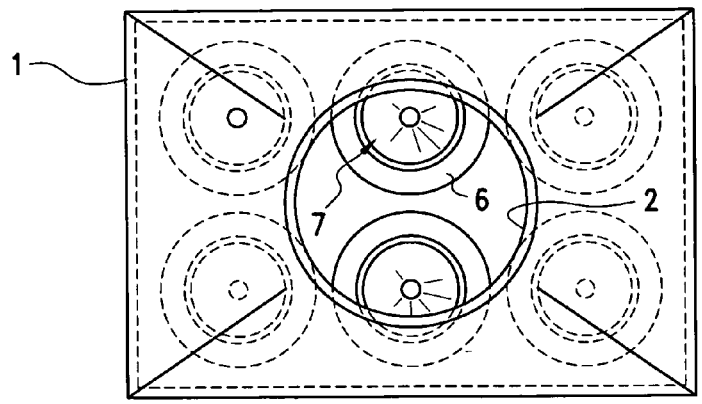
FIG. 2 is a top plan view of the dust collector housing and columns of stacked filter elements.

Referring to the drawings and more particularly to FIG. 1, the jet pulse chamber venturi dust collector of the present invention comprises a dust collector housing 1 having a dirty gas inlet 2 at the top thereof and a particulate collection hopper 3 at the bottom thereof. A plurality of stacked filter elements 4 and 5 are positioned in the housing and arranged in spaced columns 6. The filter elements 4 and 5 are held in stacked relationship by conical end caps 7, and the lower end of each stack is mounted on and communicates with a clean air duct 8. A compressed air line 9 extends into the clean air duct and is provided with a plurality of nozzles 10 communicating with a respective venturi 11 communicating with the interior of the stacked filter elements 4 and 5. Each nozzle 10 is operatively connected to an electrically operated valve 12 which is connected to a controller, such as a microprocessor 13.

Figure 4:
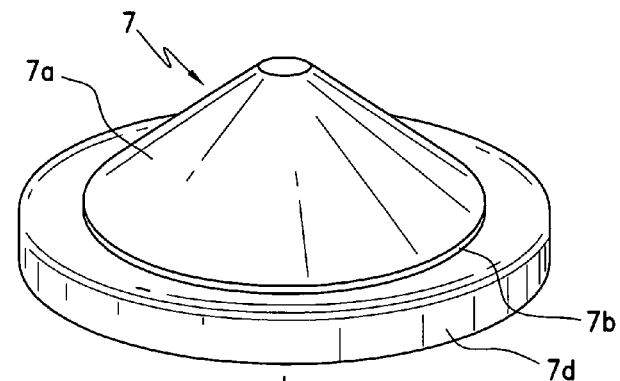
FIG. 4 is an exploded view of the conical end cap and associated gasket for securing the filter elements in stacked relationship.
Figure 5:
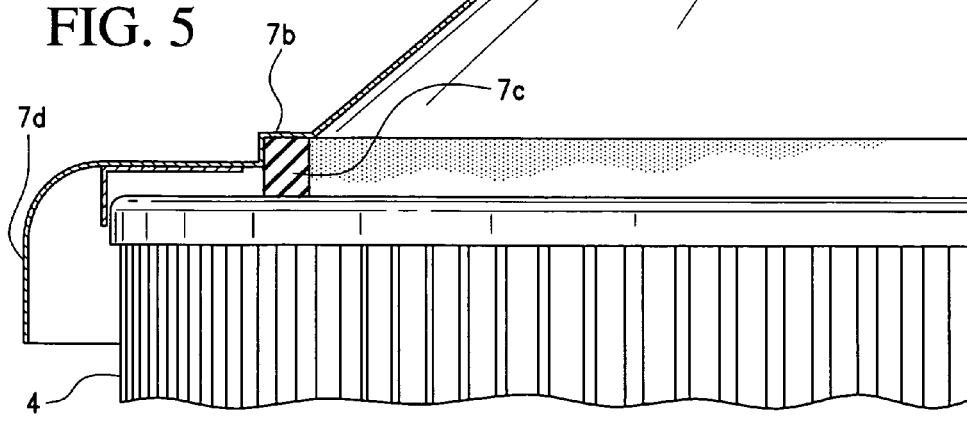
FIG. 5 is a fragmentary, sectional side elevational view showing the conical end cap in the assembled position on a filter element.

The details of the construction of each end cap 7 are shown in FIGS. 4 and 5 wherein it will be seen that each cap includes a conical portion 7a having a shoulder 7b for receiving a gasket 7c. The lower end of the conical portion 7a terminates in a depending skirt portion 7d. When assembled, the cap 7 is secured to the stacked filter elements 4 and 5 by a suitable clamp, not shown, so that the gasket 7c is held tightly against the upper end portion of filter element 4.

Figure 3:
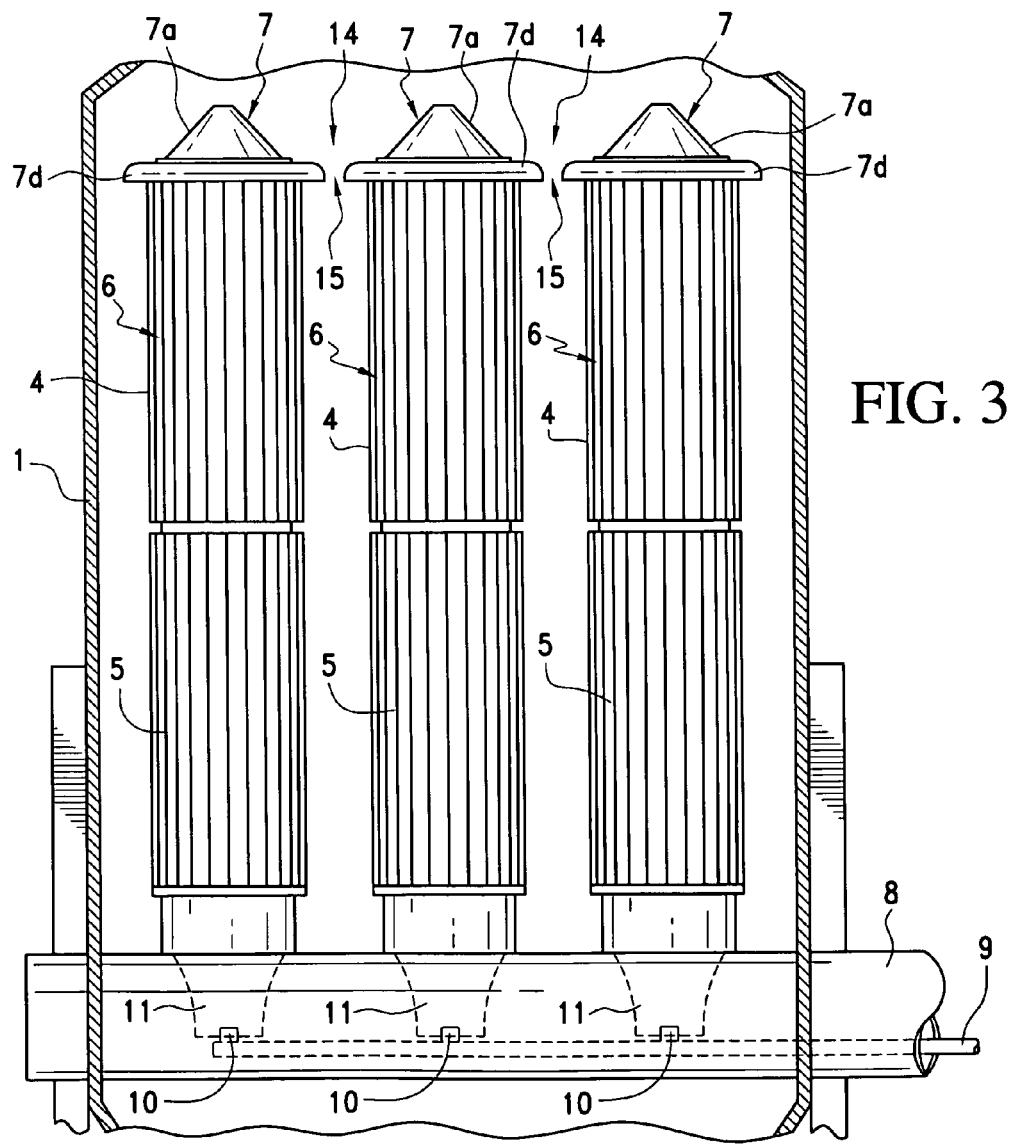
FIG. 3 is a fragmentary, sectional, side elevational view of the dust collector housing and columns of stacked filter elements.

As will be seen in FIG. 3, when the stacked filter elements 4 and 5 are arranged in the columns 6, the conical portion 7a of the cap in one column diverges outwardly away from the conical portion 7a of the corresponding cap in the adjacent column, to thereby provide an entrant portion 14 to a throat 15 formed by the cap skirt portion 7d in one column being spaced in close proximity to the corresponding cap portion 7d in the adjacent column. By the construction and arrangement of the caps 7, a chamber venturi is provided, whereby as the dust laden air flows downwardly from the entrant portion 14 and into the throat 15, the flow is accelerated to such a degree that a significant amount of dust bypasses the filters 4 and 5 and is pushed downwardly directly into the dust collecting hopper 3.

The dust particles which are not propelled directly to the dust collecting hopper cling to the exterior of the filter elements 4 and 5 and are periodically removed therefrom by a double pulse cleaning system wherein a first pulse of compressed air is fired through the nozzles 10 and the venturi 11 into the interior of the filter elements 4 and 5. The first pulse is instantaneously followed by a second pulse of compressed air, as programmed by the controller 13. The dust particles are pushed from the exterior surface of the filter elements 4 and 5 and become entrained with the dust-laden air being propelled by the chamber venturi into the dust collecting hopper 3.

From the above description, it will be appreciated by those skilled in the art that the jet pulse chamber venturi dust collector of the present invention is an improvement over conventional downflow dust collectors which depend solely on gravity to move dust particles downwardly to the hopper; whereas, in the dust collector of the present invention, the dust particles are forced downwardly between the filter stacks directly to the hopper.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. In a downflow dust collector having a plurality of horizontally spaced vertically extending filter elements mounted in a housing having a particulate laden gas inlet and a particulate collecting hopper at the bottom thereof, the improvement comprising a conical end cap secured to the upper end of each filter element, the conical end cap at the end of one filter element being in close proximity to the corresponding conical end cap on the adjacent filter element, whereby the space between the adjacent conical end caps provides an entrant portion communicating with the particulate laden gas inlet and a throat portion communicating with the entrant portion, to thereby form a venturi in the space between adjacent filter elements, whereby the particulate laden air flows downwardly from the entrant portion into the throat portion where the flow is accelerated, thereby propelling the particulates directly to the dust collecting hopper.

2. In a downflow dust collector, according to claim 1, wherein a double pulse cleaning system is positioned at the lower end portions of the filter elements, said double pulse cleaning system comprising a source of compressed air, a nozzle positioned at the lower end portion of each filter element and communicating with the interior of a respective cleaning element and said compressed air source, an electrically operated valve operatively connected to each nozzle and a controller connected to each valve, whereby a first pulse of compressed air is periodically fired into the interior of the filter elements followed instantaneously by a second pulse of compressed air.

3. In a downflow dust collector, according to claim 1, wherein the filter elements comprise a plurality of stacked filter elements.

4. In a downflow dust collector, according to claim 1, wherein each conical cap comprises a conical top portion, a shoulder portion, a gasket positioned in said shoulder portion and engaging the upper end of each filter element, and a lower end portion of the conical top portion terminating in a skirt, the space between the skirt portions of adjacent filter elements providing said throat portion.

5. A method of cleaning horizontally spaced vertically extending filter elements mounted in a housing of a downflow dust collector having a particulate laden gas inlet and a particulate collecting hopper at the bottom thereof, comprising the steps of:
   a. positioning a venturi at the upper end portions of adjacent horizontally spaced filter elements;
   b. directing the flow of particulate laden gas through said venturi, whereby the flow of particulate laden gas is accelerated thereby propelling the particulates directly into the particulate collecting hopper 6. The method of cleaning horizontally spaced vertically extending filter elements, according to claim 5, including the additional steps of:
   c. firing a first pulse of compressed air into the interior of the filter elements; and
   d. instantaneously firing a second pulse of compressed air into the interior of the filters.

\* \* \* \* \*